United States Patent Office 3,036,066
Patented May 22, 1962

3,036,066
INHIBITED MONOMERIC SYSTEMS
Homer J. Sims, Philadelphia, Pa., assignor to Rohm & Haas Company, Philadelphia, Pa., a corporation of Delaware
No Drawing. Filed Sept. 17, 1959, Ser. No. 840,515
14 Claims. (Cl. 260—239.3)

This invention deals with inhibited monomeric systems. It further deals with a method for inhibiting a monomeric compound subject to autopolymerization.

It is known that a great many ethylenic compounds are subject to autopolymerization. This is particularly so when the ethylenic compounds are distilled or sublimed in an attempt to purify them. It is also known that many ethylenically unsaturated compounds can be stabilized or inhibited with certain polymerization inhibitors or stabilizers. Many of the commonly used inhibitors or stabilizers are relatively ineffective, particularly when autopolymerizable monomers are distilled or sublimed. Also, many of the known inhibitors or stabilizers distill along with the vapors so that distillation is not a certain or practical way of providing pure, uniform monomers. Also, many of the known inhibitors or stabilizers contain reactive functional groups, such as amino or phenolic groups, which frequently react with the monomer concerned and substantially thwart the attempted purifying process. Accordingly, it is very difficult to find an inhibitor or stabilizer which is effective and practical, particularly in purifying processes.

According to the teachings of this invention, monomeric compounds susceptible to autopolymerization may be effectively and practically inhibited and stabilized, particularly in the purifying stages of operation, by incorporating in the concerned monomer at inhibiting or stabilizing amount of methyleneanthrone.

Methyleneanthrone may be prepared by adding 20 parts of anthrone to 100 parts of methanol and, while this solution is refluxing, adding 0.5 part of pyridine. This is then followed by the addition of 25 parts of aqueous 37% formaldehyde. Refluxing of the reaction mixture is continued for about 10 to 15 minutes. The reaction mixture is then cooled and the precipitate that forms may be recrystallized from benzene to yield 5 parts of yellow crystals melting at 147°–149° C.

Methyleneanthrone is extremely effective as an inhibitor and stabilizer for ethylenically unsaturated monomers that are susceptible to autopolymerization. Methyleneanthrone is particularly effective in situations where a monomer is to be purified and stabilized by distillation, sublimation, or similar processes. It is also an effective inhibitor and stabilizer for storage, transportation, and the like of monomers susceptible to autopolymerization, especially under conditions where the presence of oxygen is kept at a minimum. It is preferred to employ methyleneanthrone as an inhibitor and stabilizer in substantially in vacuo situations.

Methyleneanthrone is effective for the present purposes even in trace amounts and it has been repeatedly observed that it is quite effective inmeasurable amounts down to 0.001% by weight. The upper limit of methyleneanthrone employed is governed to a large extent by considerations of economics and convenience but, as a practical upper limit, 3.0% by weight is employed. The preferred range is 0.1–2.0% by weight, particularly when distillation and sublimation processes are contemplated. The above amounts are based on the weight of the monomer to be inhibited. The lower amounts in the range may be employed for storage, weighing, transportation, and the like. While methyleneanthrone itself is the most effective inhibitor and stabilizer contemplated in the present instance, there may also be employed methyleneanthrones that have been substituted with halogen atoms, such as chlorine, or lower alkyl groups, such as methyl, ethyl, and butyl. It is to be understood that such substituted methyleneanthrones come within the gamut of this invention.

The methyleneanthrone may be introduced into the monomer concerned by any conventional method and in any of the defined amounts. The monomeric system concerned is thus assured of inhibition and stabilization, particularly when any oxygen present is kept at a minimum; and then, when it is desired to free the concerned monomer from the methyleneanthrone, such may be readily achieved by a distillation, sublimation, or similar technique. The monomer thus purified and stabilized can be polymerized with a minimum of initiator and can be treated in a conventional way with certainty of outcome. There is, therefore, provided a system and method which are highly effective and quite practical.

Ethylenically unsaturated compounds which are effectively inhibited and stabilized by methyleneanthrone include a great variety of autopolymerizable monomers. These monomers may be hydrocarbons, etsers, amides, nitriles, sulfides, lactams, acid halides, or compounds having an isocyanate, isothiocyanate, urea or urethane grouping or other vinylidene or active ethylenically unsaturated compounds. The most valuable effects of methyleneanthrone and the aforementioned substituted methyleneanthrones are obtained in the substantial absence of oxygen.

Typical esters which may desirably be volatilized from a mixture of ester and methyleneanthrone include the alkyl, cycloaliphatic, including cycloalkyl and terpenyl, aralkyl, alkenyl, and aryl esters of arcrylic, methacrylic, α-chloroacrylic, α-cyanoacrylic, α-phenylacrylic, itaconic, maleic, fumaric, or other autopolymerizable ethylenically unsaturated acid or such esters having a substituent group or groups non-hydrocarbon in nature and based on oxygen, sulfur, nitrogen, or a halogen. Examples of such esters are methyl acrylate, methacrylate, chloroacrylate, or itaconate; butyl, isobutyl, sec-butyl, or tert-butyl acrylate, methacrylate, or itaconate; hexyl acrylate, methacrylate, or dihexyl maleate; octyl acrylate, methacrylate or dioctyl maleate; dodecyl acrylate, methacrylate, or didodecyl itaconate; hexadecyl acrylate; octadecyl acrylate, or methacrylate, or corresponding maleate, fumarate, or itaconate; cyclohexyl, trimethylcyclohexyl, chlorocyclohexyl, or butylcyclohexyl acrylate, methacrylate, or corresponding maleate; benzyl, methylbenzyl, or chlorobenzyl acrylate or methacrylate; phenyl, chlorophenyl, dichlorophenyl, tolyl, xylyl, butylphenyl, or methylchlorophenyl acrylate or methacrylate; dicyclopentenyl, dicyclopenyl, or terpenyl acrylate, methacrylate, or corresponding itaconate, or maleate; methoxyethyl, butoxyethyl, phenoxyethyl, benzoxyethyl, dodecyloxyethyl, ethoxypropyl, octoxypropyl, chlorophenoxypropyl, ethoxyethoxyethyl, butoxyethoxyethyl, or butylphenoxyethoxyethyl acrylate or methacrylate; hydroxyethyl, hydroxypropyl, or hydroxybutyl acrylate or methacrylate; dimethylaminoethyl, tert-butylaminoethyl, tert-octylaminoethyl, morpholinoethyl, or tert-octylaminopropyl acrylate or methacrylate; isocyanatoethyl acrylate or methacrylate; ethoxycarbamylethyl acrylate or methacrylate; cyanoethyl acrylate or methacrylate; allyl acrylate, methacrylate, or corresponding maleate; vinoxyethyl acrylate or methacrylate; undecenyl acrylate or methacrylate; nitropropyl acrylate or methacrylate; or other volatizable monomeric esters of polymerizably ethylenically unsaturated esters.

Similarly, there may be used vinyl esters of carboxylic acids, such as vinyl acetate, vinyl propionate, vinyl laureate, or vinyl oleate, or vinyl crotonate, vinyl 4-pentenoate, or vinyl sorbate.

Amides of unsaturated acids are also purified by distilling or subliming them in the presence of a methyleneanthrone. The amide may be unsubstituted, as acrylamide or methacrylamide or it may have one or two N-substituents, as in N-methylacrylamide, N,N-dimethylacrylamide, N-n-butylmethacrylamide, N-phenylmethacrylamide, N-cyclohexylacrylamide, N-cyclohexyl-N-methylacrylamide, N-benzyl-N-methylmethacrylamide, N-allylacrylamide, N-n-dodecylacrylamide, N-n-dodecylmethacrylamide, N,N-diphenylacrylamide, N-acrylylmorpholine, N-methacrylylpiperidine, N,N'-ethylenebisacrylamide, or N-vinyloxyethylacrylamide. Amides and imides of divalent acids may likewise be so treated such as maleimide, N-methyl maleamic acid, N-butylmaleamic acid, N-benzylmaleamic acid, N-butylmaleimide, N-benzylmaleimide, N-allylmaleimide, or N-phenylmaleimide. The unsaturation may be in the N-substituent as well as in the acid residue as in N-vinylphthalimide or N-vinylsuccinimide. Lactams may likewise advantageously be considered, such as N-vinylpyrrolidinone, N-vinylpiperidinone, or N-vinylcaprolactam, and alkyl substituted N-vinyl lactams. Similarly, methylenelactones can be advantageously purified by the method of this invention, such as methylenebutyrolactone.

Anhydrides and acids also come into consideration and also the acid halides, the last benefiting greatly by distillation from a mixture containing methyleneanthrone.

Another type of vinylidene compound which may advantageously be purified by distilling in the presence of methyleneanthrone comprises the vinyl thioethers, among which there are some sensitive compounds. There may thus be treated butyl vinyl thioether, hydroxyethyl vinyl thioether, cyclohexyl vinyl thioether, benzyl vinyl thioether, tert-dodecyl vinyl thioether, N,N-dimethylaminoethyl vinyl thioether, or ethyleneureidoisobutyl vinyl thioether.

There are numerous other polymerizable vinylidene compounds and also α,β-unsaturated compounds which can advantageously be distilled or sublimed in the presence of methyleneanthrone. These include acrylonitrile, methacrylonitrile, β-chloroacrylonitrile, styrene, p-chlorostyrene, vinyl toluene, methylstyrene, vinyl pyridines, and 2-vinylthiophene.

Methyleneanthrone is a particularly effective inhibitor and stabilizer for acrylic and methacrylic monomers and these typically include acrylonitrile, methacrylonitrile, alkyl methacrylates, alkyl acrylates, acrylamide, methacrylamide, lower alkyl substituted methacrylamides and acrylamides and others known in the art as acrylic or methacrylic monomers. In such systems, methyleneanthrone is consistently up to seventy times and more as effective as benzoquinone. Methyleneanthrone is, also, quite effective with styrene and closely related monomers, particularly in substantially in vacuo situations.

The inhibited and stabilized systems of this invention, as well as the method for inhibiting and stabilizing autopolymerizable monomers, may be more fully understood from the following examples which are offered by way of illustration and not by way of limitation. In all instances in the following examples, without the use of methyleneanthrone, polymerization is consistently observed. Parts by weight are used throughout.

*Example 1*

There are introduced into a reaction vessel 100 parts of methyl acrylate and 2.0 part of methyleneanthrone. The resulting mixture is subjected to distillation and there is no noticeable formation of polymer in the apparatus during the distillation. At the conclusion of the distillation, there is no observable polymer formed.

In a similar way, 40 parts of methyl methacrylate is distilled in the presence of 0.05 part of methyleneanthrone with similar results.

Likewise, 65 parts of butyl vinyl thioether and 0.15 part of methyleneanthrone are distilled with no polymer formation.

*Example 2*

There are added to a reaction flask 50 parts of methacrylamide and 0.05 part of methyleneanthrone. The mixture is distilled and there is no observable polymer formed during the process.

In a similar way, 150 parts of ethyl fumarate is distilled in the presence of 1.0 part of methyleneanthrone with similar satisfactory result of no substantial polymer formation. Likewise, 75 parts of methyl maleate is distilled in the presence of 0.75 part of methyleneanthrone with like results.

*Example 3*

There are mixed together 100 parts of acrylonitrile and 0.3 part of methyleneanthrone. The mixture is then distilled and the acrylonitrile is obtained with no observable amount of polymer formation.

In like manner, methacrylonitrile is distilled with 0.5 part of methyleneanthrone with no observable polymer formation.

Similarly, there is satisfactorily distilled in the presence of 0.60 part of methyleneanthrone, 85 parts of N,N-dimethylacrylamide, 90 parts of N-vinylphthalimide, and 80 parts of butyl itaconate, respectively, with no observable polymer formation.

*Example 4*

There are mixed together 80 parts of tert-butylaminoethyl methacrylate and 1.2 parts of methyleneanthrone. The mixture is distilled and the tert-butylaminoethyl methacrylate obtained with no observable polymer formation.

Similarly, employing 0.80 part of methyleneanthrone there is distilled 75 parts of vinyl acetate, 80 parts of N-vinylpyrrolidinone, and 100 parts of vinoxyethyl acrylate, respectively. No polymer formation was observed in any instance.

I claim:

1. A composition consisting essentially of an ethylenically unsaturated autopolymerizable organic monomer and a stabilizing amount of at least about 0.001% by weight of methyleneanthrone, said methyleneanthrone being the only stabilizer present.

2. A composition consisting essentially of an ethylenically unsaturated autopolymerizable organic monomer and a stabilizing amount in the range of 0.001%–3.0% by weight of methyleneanthrone, said methyleneanthrone being the only stabilizer present.

3. A composition consisting essentially of an autopolymerizable ester of acrylic acid and a stabilizing amount in the range of 0.001%–3.0% by weight of methyleneanthrone, said methyleneanthrone being the only stabilizer present.

4. A composition consisting essentially of an autopolymerizable ester of methacrylic acid and a stabilizing amount in the range of 0.001%–3.0% by weight of methyleneanthrone, said methyleneanthrone being the only stabilizer present.

5. A composition consisting essentially of an autopolymerizable vinyl ester and a stabilizing amount in the range of 0.001%–3.0% by weight of methyleneanthrone, said methyleneanthrone being the only stabilizer present.

6. A composition consisting essentially of an ethylenically unsaturated autopolymerizable amide and a stabilizing amount in the range of 0.001%–3.0% by weight of methyleneanthrone, said methyleneanthrone being the only stabilizer present.

7. A composition consisting essentially of an ethylenically unsaturated autopolymerizable lactam and a stabilizing amount in the range of 0.001%–3.0% by weight of methyleneanthrone, said methyleneanthrone being the only stabilizer present.

8. A process for inhibiting the polymerization of an autopolymerizable organic monomer which consists essentially of mixing with said monomer an inhibiting amount of at least about 0.001% by weight of methyleneanthrone, said methyleneanthrone being the only inhibitor present.

9. A process for inhibiting the polymerization of an autopolymerizable organic monomer in the substantial absence of oxygen which consists essentially of mixing with said monomer an inhibiting amount in the range of 0.001%–3.0% by weight of methyleneanthrone, said methyleneanthrone being the only inhibitor present.

10. A process for inhibiting the polymerization of an autopolymerizable ester of acrylic acid which consists essentially of mixing with said ester an inhibiting amount in the range of 0.001%–3.0% by weight of methyleneanthrone, said methyleneanthrone being the only inhibitor present.

11. A process for inhibiting the polymerization of an autopolymerizable ester of methacrylic acid which consists essentially of mixing with said ester an inhibiting amount in the range of 0.001%–3.0% by weight of methyleneanthrone, said methyleneanthrone being the only inhibitor present.

12. A process for inhibiting the polymerization of an autopolymerizable vinyl ester which consists essentially of mixing with said ester an inhibiting amount in the range of 0.001%–3.0% by weight of methyleneanthrone, said methyleneanthrone being the only inhibitor present.

13. A process for inhibiting the polymerization of an ethylenically unsaturated autopolymerizable amide which consists essentially of mixing with said amide an inhibiting amount in the range of 0.001%–3.0% by weight of methyleneanthrone, said methyleneanthrone being the only inhibitor present.

14. A process for inhibiting the polymerization of an ethylenically unsaturated autopolymerizable lactam which consists essentially of mixing with said lactam an inhibiting amount in the range of 0.001%–3.0% by weight of methyleneanthrone, said methyleneanthrone being the only inhibitor present.

References Cited in the file of this patent
UNITED STATES PATENTS
2,850,506     Boettner _____ Sept. 2, 1958

OTHER REFERENCES

Allen: J. Am. Chem. Soc., vol. 61, pages 521–522 (1939).

Schvaleva: Chem. Abstracts, vol. 40, page 568 (1946).